US007000170B2

(12) United States Patent
Slutz et al.

(10) Patent No.: US 7,000,170 B2
(45) Date of Patent: Feb. 14, 2006

(54) METHOD AND APPARATUS FOR GENERATING CRC/PARITY ERROR IN NETWORK ENVIRONMENT

(75) Inventors: Mark Slutz, Colorado Springs, CO (US); William Schmitz, Monument, CO (US); Erik Paulsen, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 507 days.

(21) Appl. No.: 10/357,957

(22) Filed: Feb. 4, 2003

(65) Prior Publication Data

US 2004/0153891 A1 Aug. 5, 2004

(51) Int. Cl.
*G11B 20/20* (2006.01)
*H03M 13/00* (2006.01)

(52) U.S. Cl. ...................................... 714/758; 714/700

(58) Field of Classification Search ................ 714/700, 714/758, 800; 713/401
See application file for complete search history.

(56) References Cited

U.S. PATENT DOCUMENTS 5,276,807 A * 1/1994 Kodama et al. ............ 710/305
5,822,330 A * 10/1998 Buckland .................... 714/700
6,697,974 B1 * 2/2004 Craft .......................... 714/700
6,760,803 B1 * 7/2004 Gauvin et al. .............. 710/305
6,874,097 B1 * 3/2005 Aliahmad et al. .......... 713/401
6,915,462 B1 * 7/2005 Davis et al. ................ 714/700

OTHER PUBLICATIONS

Arellano et al. Ultra320 SCSI: New Technology-Still SCSI Written for the SCSI Trade Association by Adaptec, Inc., Mar. 20001, SCSI Trade Association, www.scsita.org, p. 1-7.*

* cited by examiner

*Primary Examiner*—Shelly Chase
(74) *Attorney, Agent, or Firm*—Suiter•West•Swantz PC LLO

(57) ABSTRACT

A method and apparatus for generating a CRC (cyclic redundancy check)/parity error in network environment. A SCSI (small computer systems interface) bus expander such as an Ultra320 bus expander or the like is added between a sending device and a receiving device. The sending device-receiving device pair may execute a training session to determine the skew compensation. During the training session, the SCSI bus expander may figure out timing differences due to skew and adjusts the timing of each data signal to compensate for skew. For each data signal, a compensated time may be obtained. The compensated time may then be modified through a JTAG (Joint Test Action Group) port of the SCSI bus expander. The compensated times may be adjusted such that a CRC/parity error is generated on every I/O (input/output) or just some I/Os to the receiving device. By intentionally generating a CRC/parity error, the response of the devices in the SCSI environment to a CRC/parity error may be evaluated during an input/output (I/O) test.

17 Claims, 3 Drawing Sheets

METHOD AND APPARATUS FOR GENERATING CRC/PARITY ERROR IN NETWORK ENVIRONMENT

FIELD OF THE INVENTION

This invention relates generally to a method and apparatus for generating a CRC/parity error in the network environment, and particularly to a method and apparatus for generating a CRC/parity error in the SCSI environment.

BACKGROUND OF THE INVENTION

Today's standard computer architectures call for a number of peripheral devices such as disk drives, RAID devices, CD-ROM drives, modems, monitors, keyboards, printers, scanners, etc. to be operatively coupled to a computer system by peripheral buses. Peripheral buses are simply groups of conductors (or lines) designed to carry data and control signals to and from peripheral devices. A data signal is a signal representing a data bit.

An example of a peripheral bus is the small computer systems interface (SCSI) bus. The SCSI bus is designed to operate in conjunction with a computer system to provide an interface to SCSI standard peripheral devices.

SCSI buses may have signal integrity problems, especially when used on long cables or at high signaling speeds. Depending on the SCSI bus environment—cabling, backplane, drives, host adapter board (HAB), etc., a CRC/parity error on the SCSI bus may occur. A CRC/parity error is defined as a CRC error or a parity error. Even though a CRC/parity error on the SCSI bus is very rare, it does occur. In order to evaluate how the devices in the SCSI environment respond to a CRC/parity error, a CRC/parity error on the SCSI bus is intentionally generated during an input/output (I/O) test. Currently there is not good means for purposefully generating such a CRC/parity error.

One conventional way to generate a CRC/parity error is to intentionally set up a poor bus environment by using a poorly designed component (cabling, backplane, drives, HAB). However, using a poorly designed component (cabling, backplane, drives, HAB) is impractical, since these products are designed to meet all the specifications of the SCSI environment.

Another conventional way to generate a CRC/parity error is to use specifically designed hardware to generate a CRC/parity error. However, this method would add an additional device that is an outside stimulus, not normally part of the SCSI bus environment. Moreover, if this additional device is used, one would be testing how the device under test (DUT) interfaces with the test device, rather than how the DUT interfaces with a device that will be part of the final product. Furthermore, the outside stimulus device does not currently exist for Ultra320 SCSI or the current generation of SCSI that is being tested.

Thus, it would be desirable to have a practical and convenient method and apparatus for generating a CRC/parity error in the SCSI environment.

SUMMARY OF THE INVENTION

Accordingly, the present invention is directed to a practical and convenient method and apparatus for generating a CRC/parity error in the network environment. A SCSI bus expander such as an Ultra320 bus expander or the like is added between a sending device and a receiving device. The sending device-receiving device pair may execute a training session to determine the skew compensation. During the training session, the SCSI bus expander may figure out timing differences due to skew and adjusts the timing of each data signal to compensate for skew. For each data signal, a compensated time may be obtained. The compensated time may then be modified through a JTAG port of the SCSI bus expander. When the compensated time is modified by a large amount, a CRC/parity error may occur on every I/O to the receiving device. An I/O is a read or write of a specified amount of data from or to a receiving device such as a disk drive and the like. One I/O may be accomplished in one or more accesses. Alternatively, when the compensated time is modified by a small amount, a CRC/parity error may occur on just some I/O's to the receiving device. By intentionally generating a CRC/parity error, the response of the devices in the SCSI environment to a CRC/parity error may be evaluated during an input/output (I/O) test.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
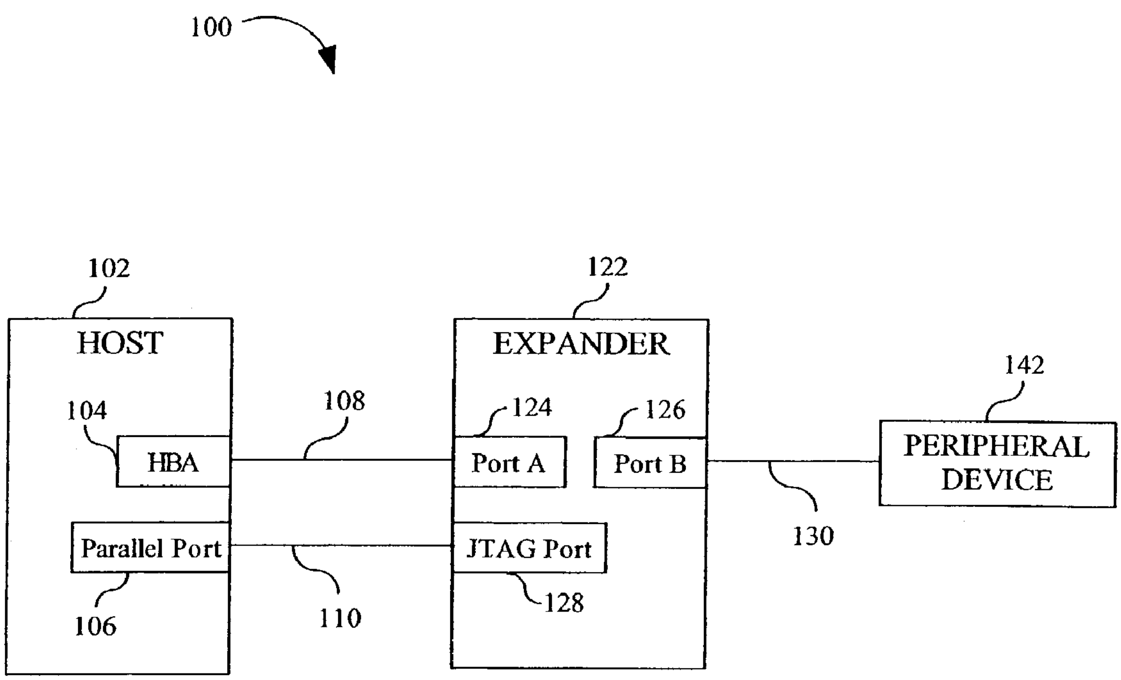
FIG. 1 is a block diagram of an exemplary apparatus for generating a CRC/parity error in the SCSI environment in accordance with the present invention.

Referring first to FIG. 1, a block diagram of an exemplary apparatus 100 for generating a CRC/parity error in the SCSI environment in accordance with the present invention is illustrated. The apparatus 100 may include a SCSI bus expander 122 between a host 102 and a SCSI standard peripheral device 142. The host 102 may take various forms, such as a server on a network, a Web server on the Internet, a mainframe computer, and the like. The host 102 may include a HBA (host bus adapter) 104, which is coupled to Port A 124 of the SCSI bus expander 122 through a SCSI cable 108. The HBA is also coupled to a system bus such as a PCI bus or a PCI-X bus (not shown) of the host 102. The host may also include a parallel port 106, which is coupled to a JTAG (Joint Test Action Group) port 128 of the SCSI bus expander 122 through a parallel cable 110.

The SCSI bus expander 122 may be an Ultra320 SCSI bus expander, or the like. The SCSI bus expander 122 passes data bits from a source bus to a load bus. Either side of the SCSI bus expander 122 may act as the source bus or the load bus. The source bus is the bus that receives the SCSI signals from the sending device. The load bus is the bus that transmits the SCSI signals to the receiving device. The SCSI bus expander 122 may include Port A 124, the JTAG port 128, and Port B 126. Port B 126 may be coupled through a SCSI cable 130 to the SCSI standard peripheral device 142 such as a disk drive, a tape drive, a CD-ROM, or the like. When the host 102 acts as a sending device and the peripheral device 142 acts as an receiving device, i.e., when the host 102 sends a SCSI signal to the peripheral device 142, the SCSI cable 108 will be the source bus, the SCSI cable 130 will be the load bus, and Port A 124 will be the receiver side of the SCSI bus expander 122. Conversely, when the peripheral device 142 acts as a sending device and the host 102 acts as an receiving device, i.e., when the peripheral device 142 sends a SCSI signal to the host 102, the SCSI cable 130 will be the source bus, the SCSI cable 108 will be the load bus, and Port B 124 will be the receiver side of the SCSI bus expander 122.

A SCSI bus may have many conductors, including a plurality of parallel data lines and a clock line. Due to switching transients in the bus drivers and other circuitry, data signals on the plurality of data wires are stable during certain time intervals and unstable during other time intervals. A data signal is a signal representing a data bit. It is important that devices connected to the bus read the data lines only during the time intervals during which the data signals are stable. Consequently, a signal on the clock wire is used to control the time period during which devices connected to the bus read data from the data lines.

SCSI buses may have signal integrity problems, especially when used on long cables or at high signaling speeds. Skew is the difference in arrival time at the receiving device between 2 or more signals that are launched at the same time. The arrival time difference may be caused by several factors including differences in length and electrical characteristics of the two signal paths. If a data transition is skewed so much relative to the clock that it falls outside of the qualifying clock window, the receiving device may not accurately detect data. In other words, when the skew becomes large enough, it may shift the arrival of a data signal relative to the clock signal at the receiving device by an amount sufficient to cause the data signal to be read in its unstable region, thereby causing a data error.

Depending on the SCSI bus environment—cabling, backplane, drives, host adapter board (HAB), etc., a CRC/parity error on the SCSI bus may occur. A CRC/parity error is defined as a CRC error or a parity error. Other potential factors to cause a CRC/parity error include a poor transmitter circuit, a poor receiver circuit, and the like. To help ensure that the data sent from one device arrives intact at its destination, various SCSI buses use two different data protection methods.

The first technique is SCSI bus parity. The parity method uses an extra bit (parity bit) for each eight bits of data, which is computed by the sending device so that the sum of all the "ones" in the nine bits taken together is either odd or even—one is chosen as the standard for the interface, and for SCSI odd parity is conventionally used. At the receiving device, the data are checked to see if the sum is still odd. If an even number of "ones" is seen, a parity error has occurred and there was a data corruption problem (because one bit is the wrong value somewhere). The sending device is then signaled to retransmit. The parity method is useful, but is limited in its effectiveness, especially for very high transfer rates. Additionally, it may not detect data errors if 2, 4, 6, or 8 bits in a given byte of data flip.

To further safeguard data, cyclic redundancy check (CRC) is utilized in the SCSI environment. CRC is a more robust method of checking for data corruption that may occur anywhere in a transmitted data message. First, a special algorithm is used, which calculates a binary CRC code as a result of arithmetic operations on the data. This CRC code is then sent along with the data over the SCSI bus by the sending device. The receiving device runs the same computation on the data and checks to see if it gets the same value that the sending device computed. If there is any difference, a CRC error has occurred: the data or the CRC code or both were corrupted during the transfer across the SCSI bus. CRC provides improved data transmission on the bus, especially at high signaling speeds.

The SCSI bus expander 122 may provide a method to account for and control skew between the clock and data signals. A sending device-receiving device pair may use the training pattern in the SPI-4 (SCSI Parallel Interface-4) draft standard to execute a training session to determine the skew compensation. It is understood that the sending device-receiving device pair may also perform a training session using a training pattern in a standard different from the SPI-4 standard without departing from the scope and spirit of the present invention. The training pattern is a pre-determined pattern that is transmitted from the sending device to the receiving device at a specified time. The receiving device may use portions of this pattern to perform skew compensation because the receiving device knows what the pattern will be, i.e., exactly when data transition should occur. The SCSI bus expander 122 passes the training patterns between the sending device and receiving device, stores the adjustment parameters, and recalls them on subsequent connections with the given device pair (nexus). The SCSI bus expander 122 may perform on its receiver side skew compensation for the sending device-receiving device pair.

Those of ordinary skill in the art will appreciate that the hardware shown in FIG. 1 may vary. For example, instead of physically located inside the host 102, the HBA 104 may be located physically outside the host 104. The depicted example is not meant to imply architectural limitations with respect to the present invention.

The present invention provides a method and apparatus for generating a CRC/parity error in the SCSI environment. By programming the timings of SCSI data signals on the receiver side of the SCSI bus expander 122 through its JTAG port 128, a CRC/parity error on the receiving device may be purposefully generated. The timings may be adjusted such that a CRC/parity error is generated on every I/O or just some I/Os to the receiving device. By intentionally generating a CRC/parity error, the response of the devices in the SCSI environment to a CRC/parity error may be evaluated during an input/output (I/O) test.

Figure 2:
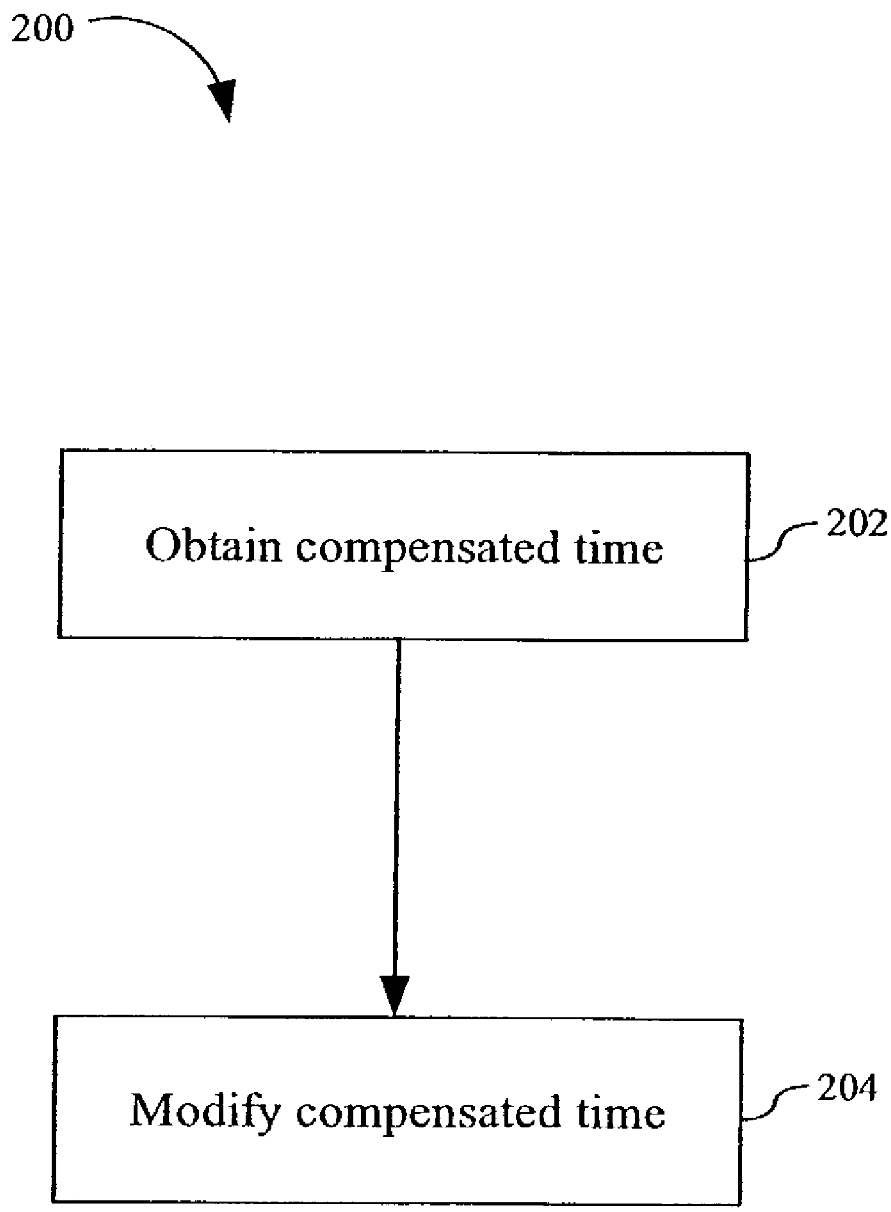
FIG. 2 is a flow chart of an exemplary process used for generating a CRC/parity error in the SCSI environment in accordance with the present invention.

Referring now to FIG. 2, a flow chart of an exemplary process 200 used for generating a CRC/parity error in the SCSI environment in accordance with the present invention is shown. The process 200 starts with Step 202 in which a compensated time for each data bit transmitted from a sending device to a receiving device is obtained. For example, the compensated time may be obtained by a sending device-receiving device pair using the training pattern in the SPI-4 draft standard to execute a training session to determine the skew compensation for the pair. It is understood that a training pattern in other standards may be used without departing from the scope and spirit of the present invention. When data and clock signals are coming from the sending device into a receiver side of an SCSI bus expander such as an Ultra320 SCSI bus expander or the like via a source bus, the receiving logic on the receiver side of the SCSI bus expander may be responsible for centering the clock signal to the exact middle of the data signals. Since there are maybe 16 data signals traveling across cable wires and board traces at a given time, there is inevitably some skewing of the timings of these data signals from what they were at the sending device. During the training session of the signaling between the sending device-receiving device pair, the SCSI bus expander figures out timing differences due to skew and adjusts the timing of each data signal to compensate for skew. For each data signal, a compensated time may thus be obtained. These compensated times may be saved in registers to be used in future I/O's with the same sending device-receiving device pair, if the pair agrees to retain training values.

Next, the compensated time may be modified 204. This modification may be performed through a JTAG port of the SCSI bus expander and may be performed on the receiver side of the SCSI bus expander. When the compensated time is modified by a large amount so that all 16 data bits are read in their unstable regions by the receiving device, a CRC/parity error may occur on every I/O to the receiving device. Alternatively, when the compensated time is modified by a small amount so that just one or several data bits, but not all 16 data bits, are read in their unstable regions by the receiving device, a CRC/parity error may occur on just some I/O's to the receiving device. By intentionally generating a CRC/parity error, how the devices in the SCSI environment respond to a CRC/parity error may be evaluated during an input/output (I/O) test.

Figure 3:
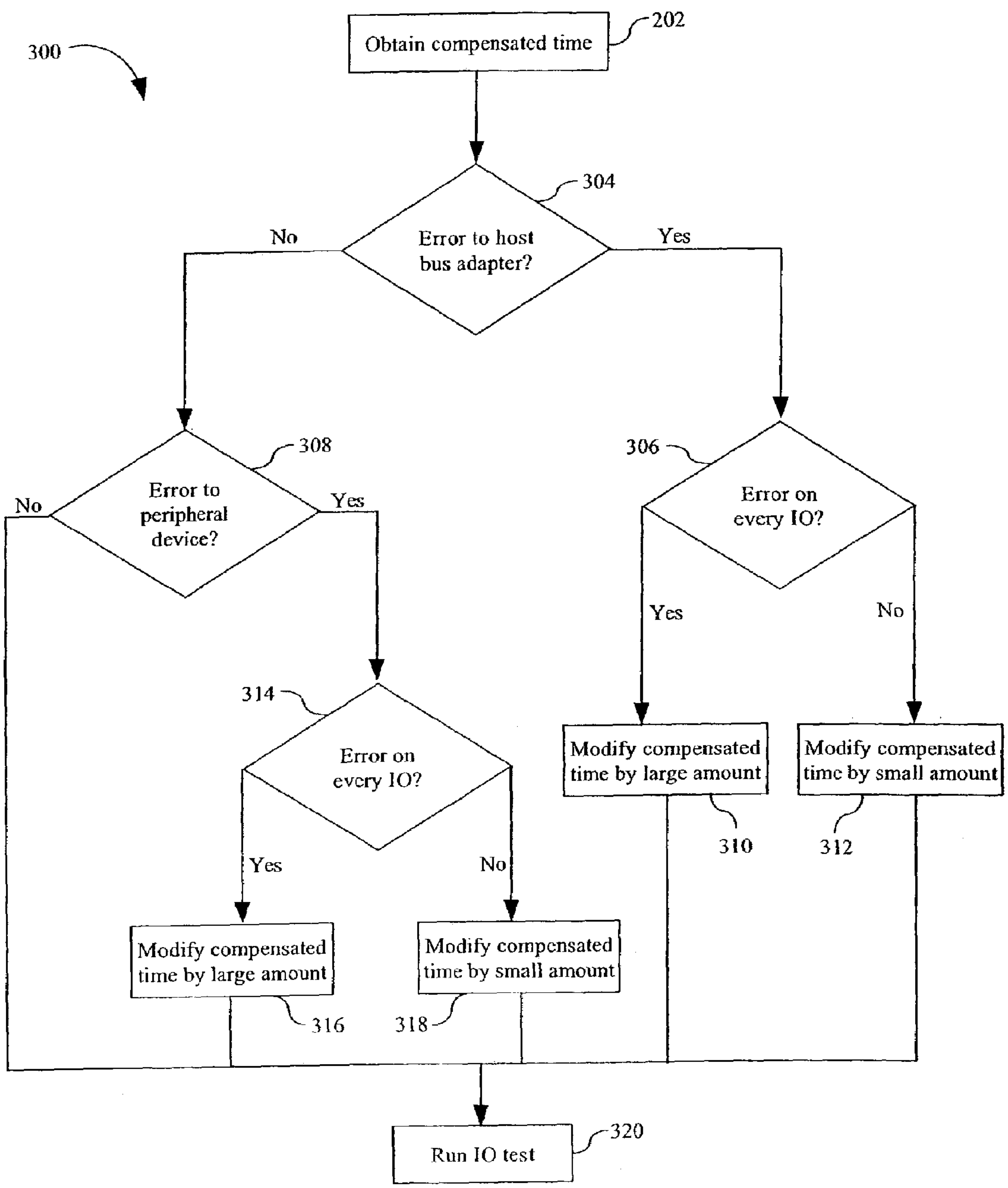
FIG. 3 is a flow chart of an exemplary process used for generating a CRC/parity error in the exemplary apparatus shown in FIG. 1 in accordance with the present invention.

FIG. 3 is a flow chart of an exemplary process 300 used for generating a CRC/parity error in the exemplary apparatus shown in FIG. 1 in accordance with the present invention. The process 300 starts with the Step 202, as described above. Specifically, in the Step 202, the HBA 104 and the peripheral device (PD) 142, as shown in FIG. 1, may use the training pattern in the SPI-4 draft standard to execute a training session to determine the skew compensation for each data signal. The SCSI bus expander 122 may figure out timing differences due to skew and adjusts the timing of each data signal to compensate for skew. For each data signal, a compensated time may be obtained. These compensated times may be saved in registers to be used in future I/O's with the HBA 104 and the peripheral device 142, if they agree to retain training values. Next, the question of whether to generate CRC/parity errors to the HBA 104 is asked 304.

When the answer to the question in Step 304 is yes, i.e., the HBA 104 is a receiving device, the question of whether to generate CRC/parity errors on every I/O is then asked 306. If the answer is yes, then the compensated time may be modified by large amount on Port B 126 (receiver side) of the SCSI bus expander 122 through the JTAG port 128 so that CRC/parity errors on all I/O's of the HBA 104 may occur in Step 310. If the answer is no, then the compensated time may be modified by small amount on Port B 126 (receiver side) of the SCSI bus expander 122 so that CRC/parity errors may occur on just some I/O's of the HBA 104.

When the answer to the question in Step 304 is no, the question of whether to generate CRC/parity errors to the peripheral device 142 is then asked in Step 308. When the answer to the question in Step 308 is yes, i.e., the peripheral device 142 is a receiving device, the question of whether to generate CRC/parity errors on every I/O is then asked 314. If the answer is yes, then the compensated time may be modified by large amount on Port A 124 (receiver side) of the SCSI bus expander 122 through the JTAG port 128 so that CRC/parity errors on all I/O's of the peripheral device 142 may occur in Step 316. If the answer is no, then the compensated time may be modified by small amount on Port A 124 (receiver side) of the SCSI bus expander 122 through the JTAG port 128 so that CRC/parity errors may occur on just some I/O's of the peripheral device 142.

Following Step 310, 312, 316, or 318, or when the answer to question in Step 308 is no, an I/O test may be run 320 to test every I/O of the receiving device.

The present invention provides a method and apparatus for generating CRC/parity errors in the SCSI environment. The present invention has many advantages. The present invention is code driven. Additionally, the present invention is time saving since one does not need to locate poorly designed components to purposefully cause CRC/parity errors. Furthermore, it is less expensive than having to purchase and/or design separate hardware, and it uses readily available production components. Moreover, the present invention may be used to verify a manufacturer's end product system.

FIGS. 1–3 depict a method and apparatus for generating a CRC/parity error in the SCSI environment. However, those of ordinary skill in the art will appreciate that the present invention may apply to any type of network environment and any type of bus that has de-skew compensation built in.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for generating a CRC/parity error in a network environment, comprising:

obtaining a compensated time for a data bit transmitted from a sending device to a receiving device; and modifying said compensated time so that said data bit is erroneous when said data bit is received by said receiving device, wherein said modifying is performed through a JTAG port of a SCSI bus expander, said SCSI bus expander being coupled to said sending device and said receiving device.

2. The method of claim 1, wherein said sending device is a SCSI host bus adaptor and said receiving device is a SCSI standard peripheral device.

3. The method of claim 1, wherein said sending device is a SCSI standard peripheral device and said receiving device is a SCSI host bus adaptor.

4. The method of claim 1, wherein said modifying is performed on a receiver side of said SCSI bus expander.

5. A method for generating a CRC/parity error in a network environment, comprising:

obtaining a compensated time for a data bit transmitted from a sending device to a receiving device; and modifying said compensated time so that said data bit is erroneous when said data bit is received by said receiving device, wherein said obtaining comprising:

transmitting a training pattern from said sending device to said receiving device; and performing skew compensation by said receiving device.

6. An apparatus for generating a data error in a network environment, comprising:

means for obtaining a compensated time for a data bit transmitted from a sending device to a receiving device; and means for modifying said compensated time so that said data bit is erroneous when said data bit is received by said receiving device, wherein said modifying is performed through a JTAG port of a SCSI bus expander, said SCSI bus expander being coupled to said sending device and said receiving device.

7. The apparatus of claim 6, wherein said sending device is a SCSI host bus adaptor and said receiving device is a SCSI standard peripheral device.

8. The apparatus of claim 6, wherein said sending device is a SCSI standard peripheral device and said receiving device is a SCSI host bus adaptor.

9. The apparatus of claim 6, wherein said modifying is performed on a receiver side of said SCSI bus expander.

10. An apparatus for generating a data error in a network environment, comprising:

means for obtaining a compensated time for a data bit transmitted from a sending device to a receiving device; and means for modifying said compensated time so that said data bit is erroneous when said data bit is received by said receiving device, wherein said means for obtaining comprising:

means for transmitting a training pattern from said sending device to said receiving device; and means for performing skew compensation by said receiving device.

11. An apparatus for generating a CRC/parity error in a SCSI environment, comprising:

a sending device suitable for sending a data signal;

a receiving device suitable for accepting said data signal, wherein a compensated time is obtained for said data signal when said sending device transmits a training pattern to said receiving device and said receiving device performs skew compensation; and a SCSI bus expander having a first port and a second port, said first port being coupled to said sending device and said second port being coupled to said receiving device, wherein said CRC/parity error is generated to said receiving device by modifying said compensated time.

12. The apparatus of claim 11, wherein said sending device is a host bus adaptor and said receiving device is a SCSI standard peripheral device.

13. The apparatus of claim 12, wherein said modifying is performed on said first port.

14. The apparatus of claim 12, wherein said modifying is performed via a JTAG port of said SCSI bus expander.

15. The apparatus of claim 11, wherein said sending device is a SCSI standard peripheral device and said receiving device is a SCSI host bus adaptor.

16. The apparatus of claim 15, wherein said modifying is performed on said second port.

17. The apparatus of claim 16, wherein said SCSI bus expander is an Ultra320 SCSI bus expander.

* * * * *